Dec. 3, 1940.  S. M. COFFMAN  2,223,717
BRAKE CONTROLLING MEANS FOR AUTOMOBILES
Filed Aug. 29, 1938
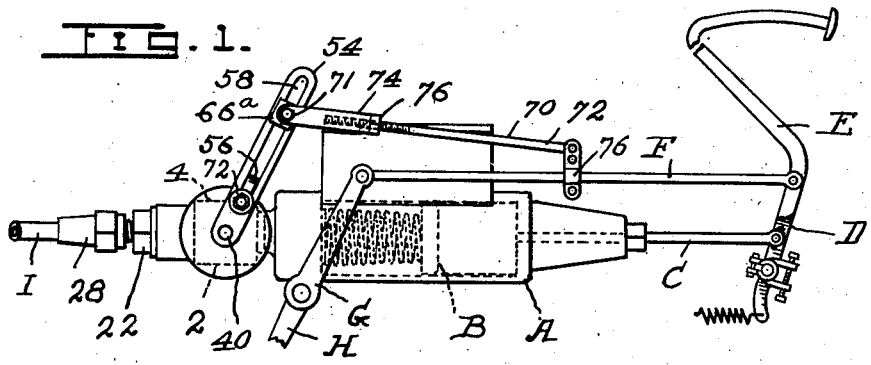
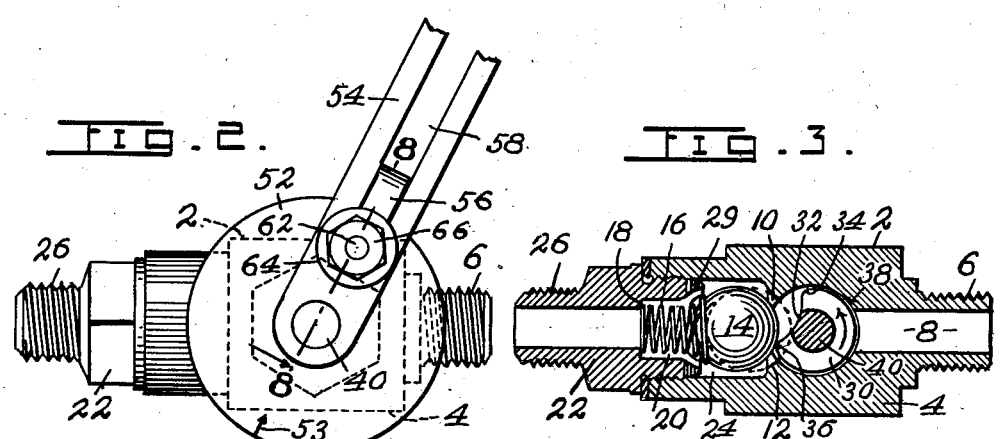
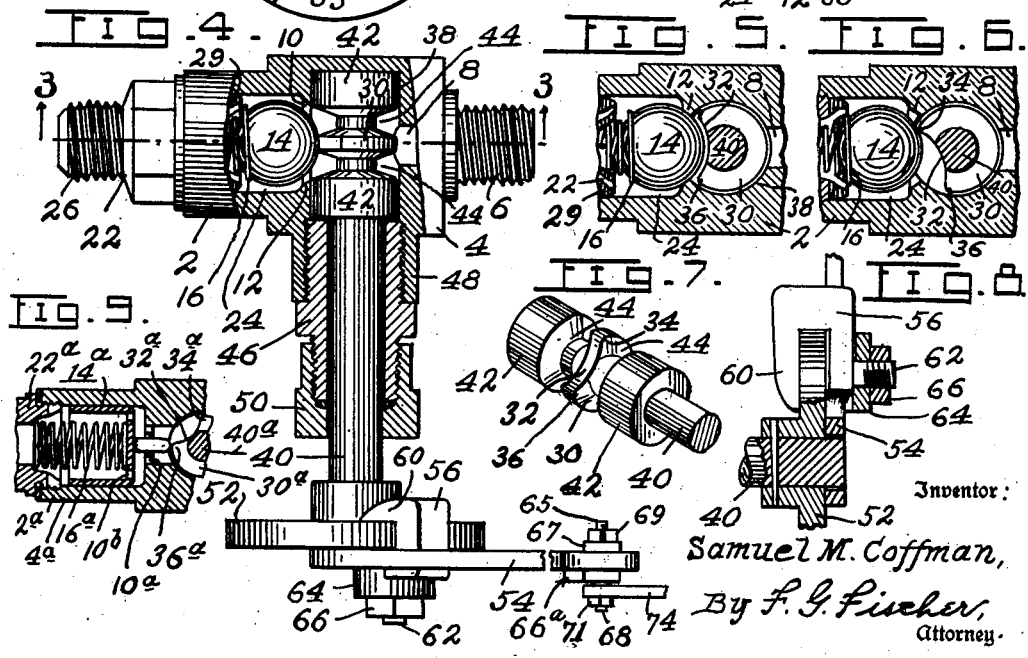
Inventor:
Samuel M. Coffman,
By F. G. Fischer,
Attorney.

Patented Dec. 3, 1940

2,223,717

UNITED STATES PATENT OFFICE 2,223,717

BRAKE CONTROLLING MEANS FOR AUTOMOBILES

Samuel M. Coffman, Kansas City, Mo., assignor of one-third to Frederick G. Fischer, Kansas City, Mo.

Application August 29, 1938, Serial No. 227,372

5 Claims. (Cl. 192—13)

My invention relates to controlling means for motor vehicle brakes and one object is to provide means of this character which will not interfere with the independent operation of the brake pedal and the clutch pedal of the motor vehicle, but when both pedals are depressed at the same time the brakes will be held in applied position until the clutch is engaged.

A further object is to provide brake controlling means whereby when the clutch pedal is depressed part way to throw out the clutch at the time the brake pedal is depressed to apply the brakes the latter will be held in applied position after the foot has been removed from the brake pedal, but the brakes may be instantly released by the driver either further depressing the clutch pedal to a point where it will have no effect upon the brakes, or by letting in the clutch.

Another object is to provide brake controlling means which will operate efficiently whether the motor vehicle is on level ground, or headed uphill or down hill.

Another object is to provide brake controlling means which may be readily installed in any suitable portion of the brake fluid distributing system of a hydraulic brake mechanism without the use of brackets or other extraneous supporting means, and which requires no direct connection with either the brake pedal or the clutch pedal for its operation.

A further object is to provide brake controlling means which will operate efficiently in different positions, so that when being installed it may be placed in the best position to avoid interference with brackets, rods, or other ordinary obstructions on the motor vehicle.

By the use of my brake controlling means the driver after stopping on an incline and depressing both pedals is free to remove his foot from the brake pedal and apply it to the accelerator preparatory to starting, without danger of the motor vehicle drifting down the incline as the brakes will be held in applied position until the clutch pedal is either allowed to move upward or is further depressed to a point where it will have no effect on the brakes. The driver may also, when coasting down hill, throw out the clutch and control the speed of the motor vehicle by intermittently depressing the brake lever while holding the clutch pedal depressed beyond the point where it will have any effect upon the brakes.

In order that the invention may be fully understood reference will now be had to the accompanying drawing, in which:

Fig. 1 is a side elevation of my invention associated with those portions of the clutch and brake mechanisms to which it is particularly applicable.

Fig. 2 is an enlarged side elevation of a valve and part of its controlling means forming important features of the invention.

Fig. 3 is a horizontal section on line 3—3 of Fig. 4, showing the valve in open position.

Fig. 4 is a plan view partly in section of the valve and associated parts.

Fig. 5 is a fragmentary sectional view showing the valve in closed position.

Fig. 6 is a fragmentary sectional view showing the valve in open position.

Fig. 7 is a broken detail of a shaft and a cam employed in opening the valve.

Fig. 8 is a fragmentary section on line 8—8 of Fig. 2.

Fig. 9 shows a modified form of the valve.

In the drawing I have illustrated only enough of the clutch and brake mechanisms necessary to portray my controlling means, and it is to be understood that such clutch and brake mechanisms are of conventional or preferred forms which operate in the customary manner.

Referring in detail to the different parts, A designates the master cylinder forming part of the hydraulic brake system, and in which the piston B is reciprocably mounted and operably connected by piston-rod C to the brake pedal D arranged in the usual manner beside the clutch pedal E which controls the clutch, not shown, through the rod F and levers G and H, respectively.

Referring now more particularly to the parts forming the present invention, 2 designates a valve preferably of the ball type, although it may be of the flap or any other suitable type. The valve 2 is provided with a casing 4 having a reduced end 6 adapted to be threaded into the outlet opening of the master cylinder A. An axial duct 8 extends longitudinally through the casing 4 and communicates at its inner end with a port 10 surrounded by a seat 12 adapted to be engaged by a ball 14 to close the port 10. The ball 14 is urged towards seat 12 with a coil spring 16, interposed between the ball and an internal shoulder 18 formed in the enlarged bore 20 of a nipple 22. When in closed position the ball 14 protrudes through port 10 as shown by Fig. 5.

One end of the nipple 22 is threaded in the enlarged portion 24 of the duct 8, and its other end 26 is adapted to be screwed into one end of a coupling 28 which connects the nipple to one end of the main fluid distributing pipe I of the hydraulic brake system. The inner end of the nipple 22 has marginal ports 29 through which the brake fluid may freely flow past the ball 14 in the event the same should be forced against the nipple by pressure of the brake fluid when the master piston B is advanced.

In motor vehicles now in use the coupling 28 is usually threaded upon the outlet nipple of the master cylinder A, so that when installing my device it is only necessary to discard said outlet nipple and screw the end 6 of the casing 4 into the outlet opening of the master cylinder and then screw the coupling 28 upon the end 26 of the nipple 22. Obviously valve 2 may be connected at any convenient point to the main distributing pipe I, should it be found inconvenient, in some instances, to connect it directly to the master cylinder B, as shown. Easy installation is also had through the construction of valve 2, which will operate efficiently when placed in a horizontal, vertical, inclined, or other position.

Normally the ball 14 is held unseated with a cam 30, preferably of segmental form and provided with a concavity 32 of such size as to receive the protruding portion of the ball 14 when seated as shown by Fig. 5. The concavity 32 is located between two shoulders 34 and 36, respectively, either of which is adapted to unseat the ball 14 as will hereinafter appear. The cam 30 is located in a recess 38 communicating with the duct 8 and the port 10 and is fixed upon the inner portion of a rock shaft 40 provided with journals 42 mounted in the recess 38 and spaced laterally from the cam 30 to leave passageways 44 through which the brake fluid may freely flow when the master piston B is advanced.

The shaft 40 extends outwardly through a bushing 46 threaded at its inner end in a tubular lateral extension 48 of the valve casing 4, and said bushing 46 is provided at its outer end with a stuffing-box 50 to prevent leakage of the brake fluid. The outer end of the shaft 40 is equipped with a fixed disk 52 having an index mark 53 arranged in known relation with the concavity 32, so that the position of the latter can be readily determined when my controlling means is being installed.

A lever 54 is loosely mounted upon the shaft 40 beside the disk 52 so that when installing my controlling means said lever may be rotated independently of the disk 52 and the cam 30 to the most advantageous position for connection with a suitable part of the clutch mechanism. After being rotated to the desired point the lever 54 is firmly secured to the disk 52 by suitable means comprising in the present instance a U-shape clamp 56 extending through a longitudinal slot 58 in the lever 54. The clamp 56 is provided at one side with a fixed jaw 60 and at its opposite side with a threaded shank 62 equipped with a washer 64 and a nut 66, which latter when threaded upon the shank 62, forces the washer 64 firmly against the adjacent side of the lever 54 and thereby pulls the jaw 60 tightly against the disk 52 so that the same will rock with the lever 54.

The slotted portion 58 of the lever 54 is equipped with a slidable block 66a adapted to be slid the full length of the slot so that the stroke of the lever may be shortened or lengthened to properly time the application and release of the brakes with the movement of the clutch. The block 66a is provided with a threaded stud 65 having a washer 67 and a nut 69 for securing the block at any point of its adjustment in the slot 58. The block 66a also has a laterally projecting stud 68 upon which one end of a link 70 is held by a nut 71. The link 70 is preferably made in two sections 72 and 74, so that it may be lengthened or shortened to meet different conditions when my controlling means is being installed. To facilitate lengthening or shortening of the link 70 the section 72 is threaded into the section 74. A lock-nut 76 is threaded upon section 72 to abut section 74 and thus firmly lock said sections together. The link 70 is operably connected to a suitable portion of the clutch mechanism. In the present instance I have shown it connected to the rod F by means of a member 76, although it is to be understood that it may be connected to any other convenient part of the clutch mechanism affording sufficient movement to operate the valve 2.

The operation is substantially as follows: In ordinary driving the clutch and brake pedals D and E, respectively, may be operated independently of each other in the usual manner, but when the vehicle is stopped on a hill and the brake and clutch pedals are depressed at the same time the cam 30 is rocked in the direction of the arrow, Fig. 3, to carry the shoulder 36 out of contact with the ball 14 and the concavity 32 into coincidence with said ball so that the same may engage seat 12 as shown by dotted lines, Fig. 3, and full lines, Fig. 5. As long as the clutch pedal E is held depressed the back pressure of the brake fluid holds the ball 14 firmly seated, thereby holding the brakes in applied position so that the driver may move his foot from the brake pedal D to the accelerator preparatory to starting. When ready to start the driver depresses the accelerator and permits the clutch pedal E to move backward to let in the clutch, which operation, through the intermediary of the connecting parts, rocks the cam 30 backward to initial position where the shoulder 36 will unseat the ball 14 and permit the brake fluid to flow back into the master cylinder A and release the brakes. Release of the brakes is ordinarily timed to occur just prior to complete engagement of the clutch, but the time of release may be changed as desired by lengthening or shortening the stroke of the lever 54 as hereinbefore mentioned.

When it becomes necessary to back down grade to avoid a collision with another car the brakes may be instantly released by depressing the clutch pedal E approximately to the limit of its downward movement, or until the shoulder 34 of the cam 30 engages and unseats the ball 14. When coasting down hill valve 2 may be held in open position by depressing the clutch pedal E far enough to cause shoulder 34 to hold the ball 14 unseated. The driver may then intermittently apply the brakes to control the speed of the car, without being required to let in the clutch to effect release of the brakes.

From the foregoing it will be understood that when cam 30 is in initial position, Fig. 3, ball 14 will be held in open position by shoulder 36, so that the brakes may be operated independently of the clutch. When cam 30 is in its second position, Fig. 5, ball 14 is free to close, so that when the brakes are applied they will be retained in active position, even though the driver removes his foot from the brake pedal, until the clutch is engaged; and when cam 30 is in its third position, Fig. 6, ball 14 will be held in open position by shoulder 34, so that the brakes may be applied and released independently of the clutch.

The modified form of valve shown by Fig. 9 is in many respects similar to valve 2, as is evidenced by corresponding reference numerals with exponents *a*. The chief difference resides in a reciprocatory plunger 14a which is substituted for the ball 14. The modified form also includes a plurality of ports 10a, in the casing 4a, instead of the single port 10, and a plurality of ports 10b in the plunger 14a. When the plunger 14a is held open by either shoulder 30a or 34a of the cam 30a, the brake fluid is free to flow in either direction through the ports 10a and 10b, but when the plunger is seated it seals the ports against the passage of the fluid.

In addition to the above, I reserve all rights to such other changes and modifications as properly fall within the spirit and scope of the invention as claimed.

Having thus described my invention, what I claim and desire to secure by Letters Patent, is:

1. In combination with suitable parts of the clutch and hydraulic brake mechanisms of a motor vehicle, a self-closing valve having a casing connected to the fluid distributing portion of the brake mechanism and adapted to close and hold the brakes in applied position after the brake pedal and the clutch pedal have been depressed, a segmental cam mounted in the valve casing and adapted to hold the valve open when the clutch is engaged, or permit the valve to close when the clutch is disengaged, a shaft extending into the valve casing and upon which said cam is mounted, a disk fixed upon the outer portion of said shaft, a lever loosely mounted upon the shaft so that it may be rotated to different positions, means for securing said lever to the disk, and means for connecting said lever to a suitable portion of the clutch mechanism.

2. In combination with suitable parts of the clutch and hydraulic brake mechanisms of a motor vehicle, a self-closing valve having a casing connected to the fluid distributing portion of the brake mechanism and adapted to close and hold the brakes in applied position after the brake pedal and the clutch pedal have been depressed, a segmental cam mounted in the valve casing and adapted to hold the valve open when the clutch is engaged, or permit the valve to close when the clutch is disengaged, a shaft extending into the valve casing and upon which said cam is mounted, a disk fixed upon the outer portion of said shaft, a lever loosely mounted upon the shaft so that it may be rotated to different positions, means for securing said lever to the disk, a connecting rod operably secured at one end to a suitable portion of the clutch mechanism, and means adjustably connecting the other end of the rod to the lever so that the movement thereof may be lengthened or shortened.

3. In combination with the clutch and hydraulic brake mechanisms of a motor vehicle, a valve casing arranged in the fluid distributing system of the brake mechanism and provided with a port for passage of the brake fluid, a ball arranged in the casing adjacent to one side of the port and adapted when in closed position to protrude through and seal said port, a rockable cam mounted in the casing at the other side of the port and provided with a peripheral concavity to receive the protruding portion of the ball when the ball is in closed position, shoulders on the cam at the respective ends of the concavity and lapping the protruding portion of the ball, each shoulder being adapted to move the ball to open position, and means operably connecting the cam to the clutch mechanism to control the cam.

4. In combination with the clutch and hydraulic brake mechanisms of a motor vehicle, a valve casing arranged in the fluid distributing system of the brake mechanism and provided with a port for passage of the brake fluid, a ball in the casing adapted to close the port, a cam mounted in the casing adapted to move said ball to open position, a rock shaft projecting from the casing and upon the inner end of which said cam is fixed, a lever loosely mounted upon the outer end of the rock shaft to permit angular adjustment thereof relative to said rock shaft, means for securing the lever in any of its adjusted positions upon the rock-shaft, and means connecting the lever to the clutch mechanism.

5. In combination with the clutch and hydraulic brake mechanisms of a motor vehicle, a valve casing arranged in the fluid distributing system of the brake mechanism and provided with a port for passage of the brake fluid, a member in the casing adapted to close the port, a cam mounted in the casing adapted to move said member to open position, a rock shaft projecting from the casing and upon the inner end of which said cam is fixed, a lever mounted upon the outer end of the rock shaft, an element adjustable longitudinally of said lever, means for firmly securing said element at any point of its adjustment upon the lever, and a rod connected to said element and the clutch mechanism.

SAMUEL M. COFFMAN.